United States Patent
Wang et al.

(10) Patent No.: US 9,940,700 B2
(45) Date of Patent: Apr. 10, 2018

(54) INFORMATION PROCESSING APPARATUS, INFORMATION PROCESSING METHOD, INFORMATION PROCESSING SYSTEM, AND NON-TRANSITORY COMPUTER READABLE MEDIUM

(71) Applicant: FUJI XEROX CO., LTD., Tokyo (JP)

(72) Inventors: Chuan Wang, Kanagawa (JP); Takeshi Onishi, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 74 days.

(21) Appl. No.: 14/693,508

(22) Filed: Apr. 22, 2015

(65) Prior Publication Data

US 2015/0228060 A1  Aug. 13, 2015

Related U.S. Application Data (63) Continuation of application No. PCT/JP2013/067855, filed on Jun. 28, 2013.

(30) Foreign Application Priority Data

Oct. 24, 2012  (JP) ................................. 2012-235188

(51) Int. Cl.
   *G06K 9/40*   (2006.01)
   *G06T 5/00*   (2006.01)
   (Continued)

(52) U.S. Cl.
   CPC ............ *G06T 5/009* (2013.01); *G06T 3/0068* (2013.01); *G06T 3/4038* (2013.01); *G06T 5/50* (2013.01);
   (Continued)

(58) Field of Classification Search
   CPC ....... G06T 11/00; G06T 11/60; G06T 3/0068; G06T 3/4038; G06T 5/009; G06T 5/50;
   (Continued)

(56) References Cited

U.S. PATENT DOCUMENTS 6,587,593 B1 * 7/2003 Matsuoka ................. G06T 5/50
                                                       382/260
6,813,391 B1 * 11/2004 Uyttendaele ............ G06K 9/03
                                                       345/629

(Continued)

FOREIGN PATENT DOCUMENTS

JP   2006-287504 A   10/2006
JP   2007-180930 A    7/2007
(Continued)

OTHER PUBLICATIONS

International Search Report for PCT/JP2013/067855 dated Jul. 30, 2013.

*Primary Examiner* — Mekonen Bekele
(74) *Attorney, Agent, or Firm* — Sughrue Mion, PLLC (57) ABSTRACT

An information processing apparatus for producing combined image data includes an image data acquiring unit that acquires two image data items a difference obtaining unit that obtains a difference in brightness between the data items a difference area identifying unit that identifies a difference area a surrounding brightness difference obtaining unit that obtains a difference between a brightness of the difference area and a brightness of an area located around the difference area a correction target area information producing unit that produces correction target area information which indicates a correction target area, in which one of the data items, having a greater difference obtained by the surrounding brightness difference obtaining unit, is used as the correction target area and a combined image data producing unit that (Continued)

produces the combined image data, based on the data items and the correction target area information.

10 Claims, 10 Drawing Sheets

(51) Int. Cl.
  *G06T 3/00*     (2006.01)
  *G06T 3/40*     (2006.01)
  *G06T 5/50*     (2006.01)
  *G06T 11/60*    (2006.01)
  *G06T 11/00*    (2006.01)
  *G06T 7/33*     (2017.01)

(52) U.S. Cl.
  CPC ............... *G06T 7/33* (2017.01); *G06T 11/00* (2013.01); *G06T 11/60* (2013.01); *G06T 2207/10016* (2013.01); *G06T 2207/20224* (2013.01); *G06T 2207/30176* (2013.01)

(58) Field of Classification Search
  CPC ......... G06T 7/0028; G06T 2207/10016; G06T 2207/20224; G06T 2207/30176
  USPC ...... 382/260, 284, 132, 274; 348/148, 204.4
  See application file for complete search history.

(56) References Cited

U.S. PATENT DOCUMENTS

| | | | |
|---|---|---|---|
| 8,384,805 B2 | 2/2013 | Kurita et al. | |
| 8,937,631 B2* | 1/2015 | Konuma | G09G 5/04 345/690 |
| 2001/0022858 A1* | 9/2001 | Komiya | G06T 5/50 382/274 |
| 2001/0024326 A1* | 9/2001 | Nakamura | G02B 26/125 359/618 |
| 2004/0247167 A1* | 12/2004 | Bueno | G06T 1/20 382/132 |
| 2005/0062737 A1* | 3/2005 | Wang | G06T 15/205 345/419 |
| 2005/0213849 A1* | 9/2005 | Kreang-Arekul | G06T 3/4038 382/284 |
| 2009/0009604 A1* | 1/2009 | Kanaoka | B60R 1/00 348/148 |
| 2009/0030302 A1 | 1/2009 | Taniguchi et al. | |
| 2010/0091119 A1* | 4/2010 | Lee | H04N 5/23248 348/208.4 |
| 2010/0277429 A1* | 11/2010 | Day | G06F 3/0416 345/173 |
| 2012/0026333 A1* | 2/2012 | Okuyama | B60R 1/00 348/148 |
| 2012/0147224 A1 | 6/2012 | Takayama | |
| 2012/0147232 A1 | 6/2012 | Takayama et al. | |
| 2012/0257088 A1* | 10/2012 | Ishii | H04N 1/19594 348/241 |

FOREIGN PATENT DOCUMENTS

| | | |
|---|---|---|
| JP | 2008-003683 A | 1/2008 |
| JP | 2010-072813 A | 4/2010 |
| JP | 2011-086275 A | 4/2011 |
| JP | 2012-138068 A | 7/2012 |
| JP | 2012-138891 A | 7/2012 |
| WO | 2006/135003 A1 | 12/2006 |

* cited by examiner

INFORMATION PROCESSING APPARATUS, INFORMATION PROCESSING METHOD, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from PCT International Application No. PCT/JP2013/067855 filed Jun. 28, 2013.

BACKGROUND

Technical Field

The present invention relates to an information processing apparatus, an information processing method, an information processing system, and a non-transitory computer readable medium.

SUMMARY

According to an aspect of the invention, there is provided an information processing apparatus for producing combined image data by combining two image data items having an area overlapping in each of the two image data items. The information processing apparatus includes: an image data acquiring unit that acquires the two image data items; a difference obtaining unit that obtains a difference in brightness between the two image data items on a basis of a result of comparison between the two image data items; a difference area identifying unit that identifies a difference area in which the difference obtained by the difference obtaining unit is greater than a predetermined value; a surrounding brightness difference obtaining unit that, in units of the two image data items, obtains a difference between a brightness of the difference area, which is acquired by the difference area identifying unit, and a brightness of an area located around the difference area; a correction target area information producing unit that produces correction target area information which indicates a correction target area, in which one of the two image data items, having a greater difference obtained by the surrounding brightness difference obtaining unit, is used as the correction target area; and a combined image data producing unit that produces the combined image data on a basis of the two image data items and the correction target area information.

BRIEF DESCRIPTION OF THE DRAWINGS

Exemplary embodiments of the present invention will be described in detail based on the following figures, wherein.

DESCRIPTION OF EMBODIMENTS

Embodiments of the invention are described in detail with reference to the accompanying drawings.

First Exemplary Embodiment

Figure 1:
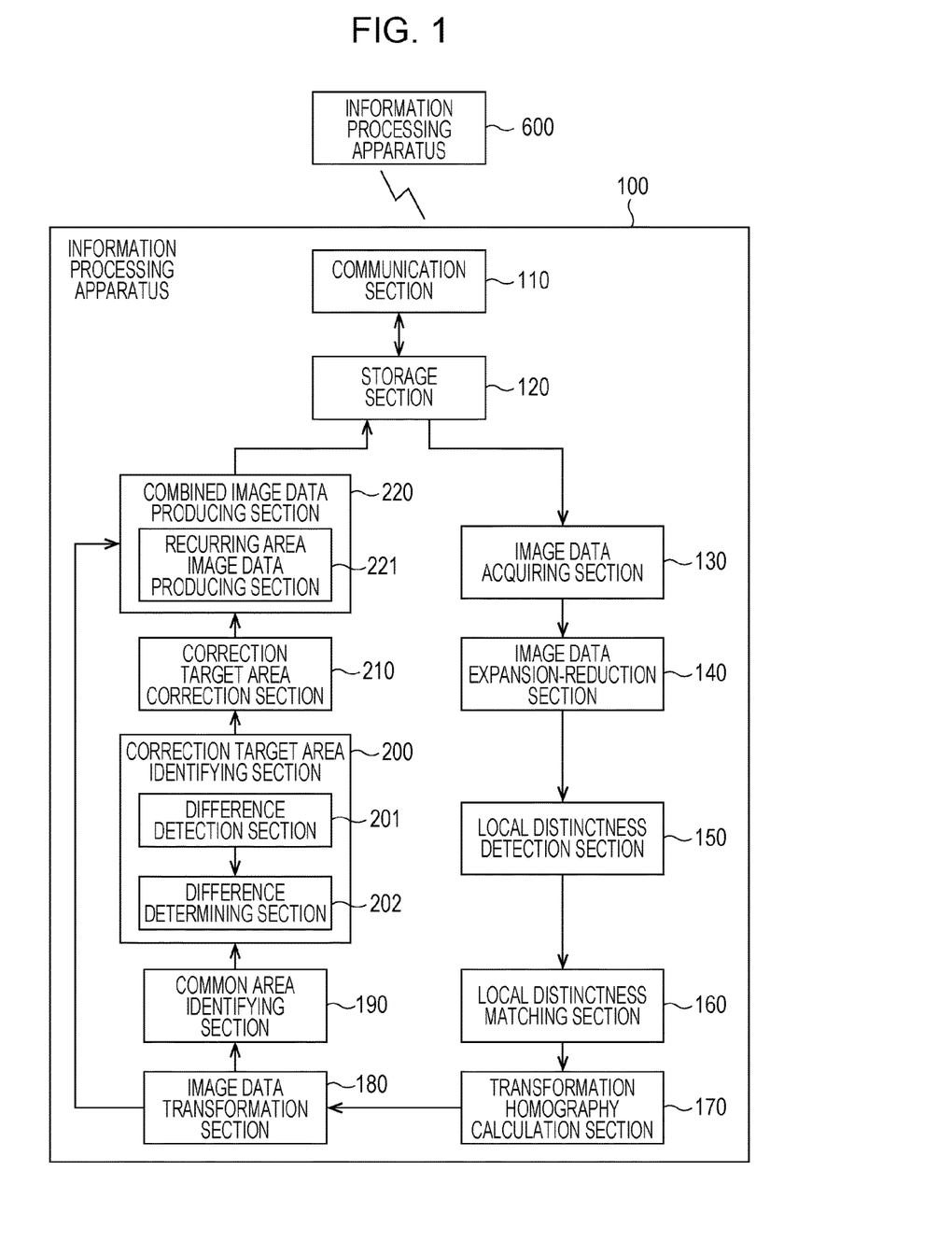
FIG. 1 is a block diagram illustrating an information processing apparatus according to a first exemplary embodiment of the invention.

FIG. 1 illustrates the configuration of an information processing apparatus 100 according to a first exemplary embodiment of the invention. The information processing apparatus 100 communicates with an information processing apparatus 600, such as a mobile phone, having a photographing function, and combines plural image data items sent from the information processing apparatus 600 so as to produce combined image data.

Figure 2:
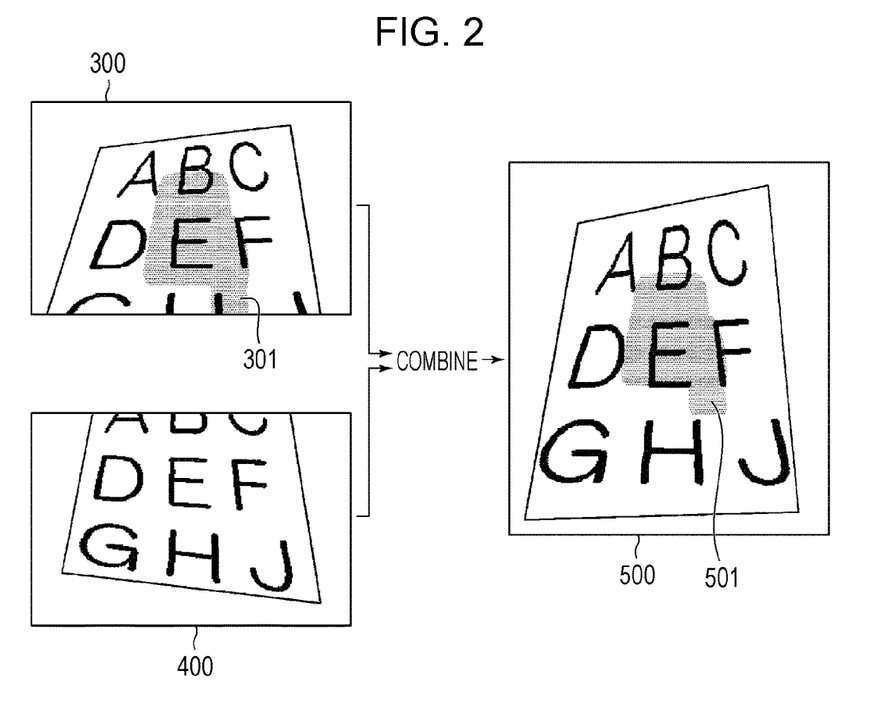
FIG. 2 illustrates each example of plural image data items to be combined by the information processing apparatus according to the first exemplary embodiment of the invention and an example of combined image data.

FIG. 2 illustrates an example of plural image data items 300 and 400 to be combined by the information processing apparatus 100 of the first exemplary embodiment of the invention and combined image data 500. A shadow 301 appears in the image data item 300 and a shadow 501 remains in the combined image data 500 if the image data items 300 and 400 are combined as they are. The information processing apparatus 100 of the embodiment is configured to reduce an effect of information included in the image data item 300 being undesirable in the combined image data 500 such as the shadow 501, and so is an information processing apparatus 900 of a second embodiment described later.

The information processing apparatus 100 has a communication section 110, a storage section 120, an image data acquiring section 130, an image data expansion-reduction section 140, a local distinctness detection section 150, a local distinctness matching section 160, a transformation homography calculation section 170, an image data transformation section 180, a common area identifying section 190, a correction target area identifying section 200, a correction target area correction section 210 and a combined image data producing section 220. The correction target area identifying section 200 further has a difference detection section 201 and a difference determining section 202, and the combined image data producing section 220 further has an overlapping area image data producing section 221.

The communication section 110, the image data acquiring section 130, the image data expansion-reduction section 140, the local distinctness detection section 150, the local distinctness matching section 160, the transformation homography calculation section 170, the image data transformation section 180, the common area identifying section 190, the correction target area identifying section 200, the correction target area correction section 210 and the combined image data producing section 220 are implemented as a function of a central processing unit (CPU) for example. The storage section 120 is formed of a storage element such as a memory.

The communication section 110 communicates with the information processing apparatus 600. The communication section 110 acquires image data from a received signal received from the information processing apparatus 600, and stores the image data in the storage section 120. Further, the communication section 110 sends combined image data produced by the combined image data producing section 220 and stored in the storage section 120 to the information processing apparatus 600 in response to a request from the information processing apparatus 600.

The image data acquiring section 130 acquires plural image data items which form combined image data from the image data sent from the information processing apparatus 600 and stored in the storage section 120, and provides the image data expansion-reduction section 140 with the image data items. The plural image data items which form the combined image data are given specific codes by the information processing apparatus 600 for example, and the image data acquiring section 130 identifies the plural image data items by referring to the codes.

The image data expansion-reduction section 140 carries out expansion-reduction processing on the plural image data items provided by the image data acquiring section 130. The expansion-reduction processing is carried out so that the plural image data items are changed into combinable sizes by using known image data expansion/reduction technologies.

Figure 3:
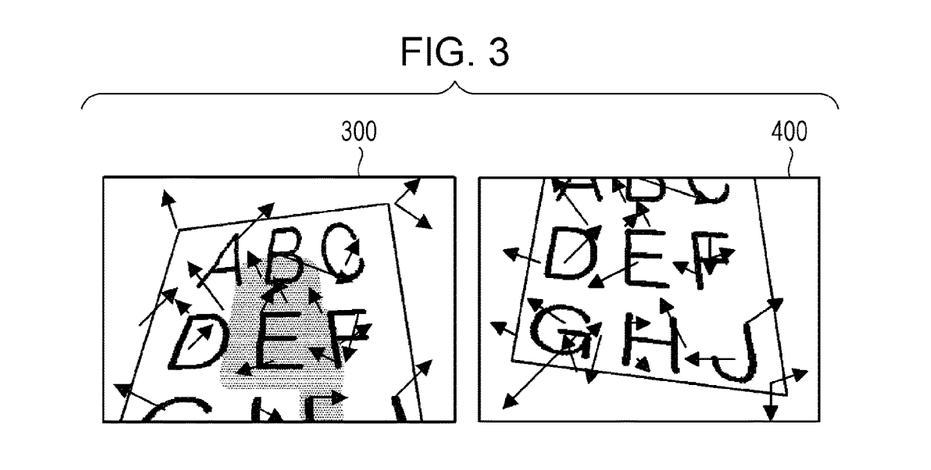
FIG. 3 illustrates an exemplary result of detection of local distinctness for the image data items illustrated in FIG. 2.

The local distinctness detection section 150 detects local distinctness in each of the plural image data items having experienced the expansion-reduction processing by the image data expansion-reduction section 140 by using local distinctness detection techniques such as Scale-Invariant Feature Transform (SIFT), Speeded Up Robust Features (SURF), etc. FIG. 3 illustrates an exemplary result of detection of local distinctness in the image data items 300 and 400 illustrated in FIG. 2. Local image patterns detected here are indicated with vectors (arrows).

Figure 4:
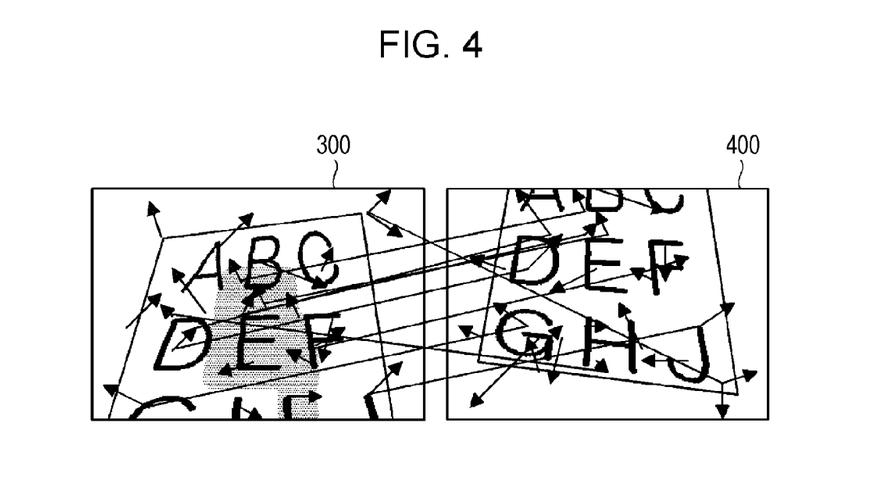
FIG. 4 illustrates an exemplary result of local distinctness matching processing carried out for the image data items illustrated in FIG. 2.

The local distinctness matching section 160 carries out local distinctness matching processing to correlate the local distinctness between these image data items on the basis of the local distinctness of the plural image data items detected by the local distinctness detection section 150. A portion overlapping in each of the image data items (overlapping area) is thereby identified. FIG. 4 illustrates an exemplary result of the local distinctness matching processing carried out for the image data items 300 and 400 illustrated in FIG. 2.

The transformation homography calculation section 170 calculates a 3×3 matrix (transformation homography) to transform the one or both of the image data items 300 and 400 so that the overlapping area has the same shape in the image data items 300 and 400 each having the overlapping area on the basis of the local distinctness detected by the local distinctness matching section 160.

The image data transformation section 180 carries out transformation processing on one or both of the image data items 300 and 400 by using the transformation homography calculated by the transformation homography calculation section 170.

Figure 5:
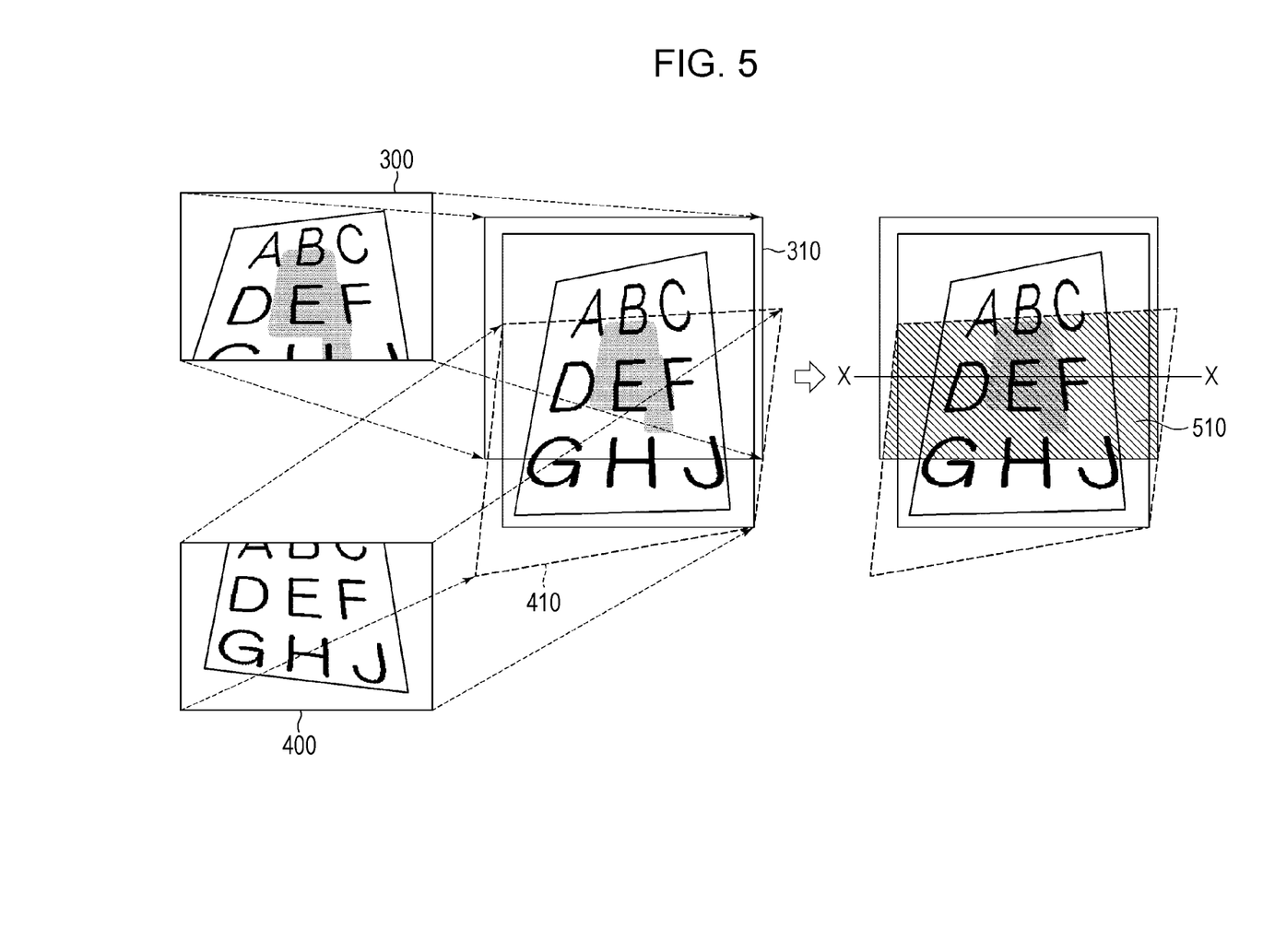
FIG. 5 illustrates an example of transformation processing on the image data items illustrated in FIG. 2 and identification processing on the common area.

The common area identifying section 190 identifies the overlapping area (common area) in the image data items 300 and 400 transformed by the image data transformation section 180. FIG. 5 illustrates an example of the transformation processing on the image data items 300 and 400 illustrated in FIG. 2 and identifying processing on the common area. The image data items 300 and 400 are transformed into an image data item 310 indicated with a solid line and an image data item 410 indicated with a dashed line by using the transformation processing, respectively, and a common area 510 is thereby identified.

The correction target area identifying section 200 identifies a correction target area in the common area identified by the common area identifying section 190. The correction target area identifying section 200 produces correction target area information which indicates a correction target area in the area in at least one of the two image data items overlapping in the other image data item on the basis of a result of comparing the image data items 300 and 400.

To begin with, the difference detection section 201 of the correction target area identifying section 200 detects a difference in brightness between pixels expected to correspond to each other in the common area in the image data items 300 and 400. The difference determining section 202 of the correction target area identifying section 200 identifies an area (difference area) in which the difference detected by the difference detection section 201 is not smaller than a predefined threshold.

Further, the correction target area identifying section 200 obtains a difference in brightness between the difference area and an area located around the difference area in the image data item 300. The correction target area identifying section 200 similarly obtains a difference in brightness between the difference area and an area located around the difference area in the image data item 400. Then, the correction target area identifying section 200 identifies a difference area in which the obtained difference is larger as the correction target area, and produces correction target area information which indicates the correction target area.

Figure 6:
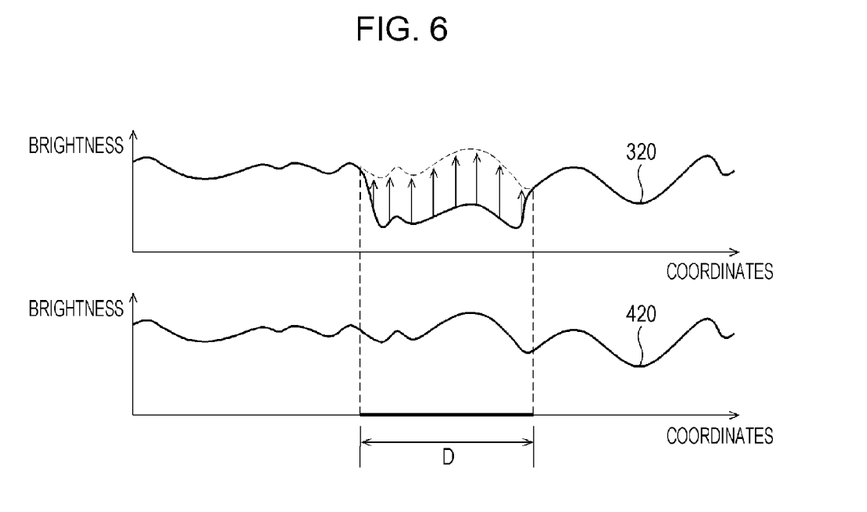
FIG. 6 includes graphs illustrating data processing by a correction target area identifying section.

Data processing by the correction target area identifying section 200 will be specifically described. FIG. 6 illustrates data processing by the correction target area identifying section 200.

In FIG. 6, a curve 320 of an upper graph indicates brightness in the image data item 300, and a curve 420 of a lower graph indicates brightness in the image data item 400. In these graphs, the vertical axe represents coordinates along X-X in FIG. 5 and the vertical axe represents the brightness.

The correction target area identifying section 200 compares the curve 320 and the curve 420 at first, and identifies an area D in which the difference is larger than the threshold. Then, the correction target area identifying section 200 compares a difference $d_{300}$ between the brightness of the area D on the curve 320 and the brightness of the surrounding area with a difference $d_{400}$ between the brightness of the area D on the curve 420 and the brightness of the surrounding area, and identifies the area corresponding to the difference area D in the image data item 300 whose difference is larger as the correction target area.

The correction target area correction section 210 carries out correction processing on the correction target area on the basis of the correction target area information produced by the correction target area identifying section 200. Specifically, the correction target area correction section 210 carries out data processing to make a pixel value of a pixel included in the correction target area in the image data item 300 close to a pixel value of a pixel included in an area in the image data item 400 corresponding to the correction target area. More specifically, the correction target area correction section 210 gives each of a pixel value of a pixel in the correction target area (correction target area in the image data item 300) and a pixel value in the common area unidentified as the correction target area (area in the image data item 400 corresponding to the correction target area) a predefined weighting, and then carries out addition. The pixel value in the common area unidentified as the correction target area is given a heavier weighting here. The curve 320 is thereby corrected as indicated with arrows in FIG. 6.

Figure 7:
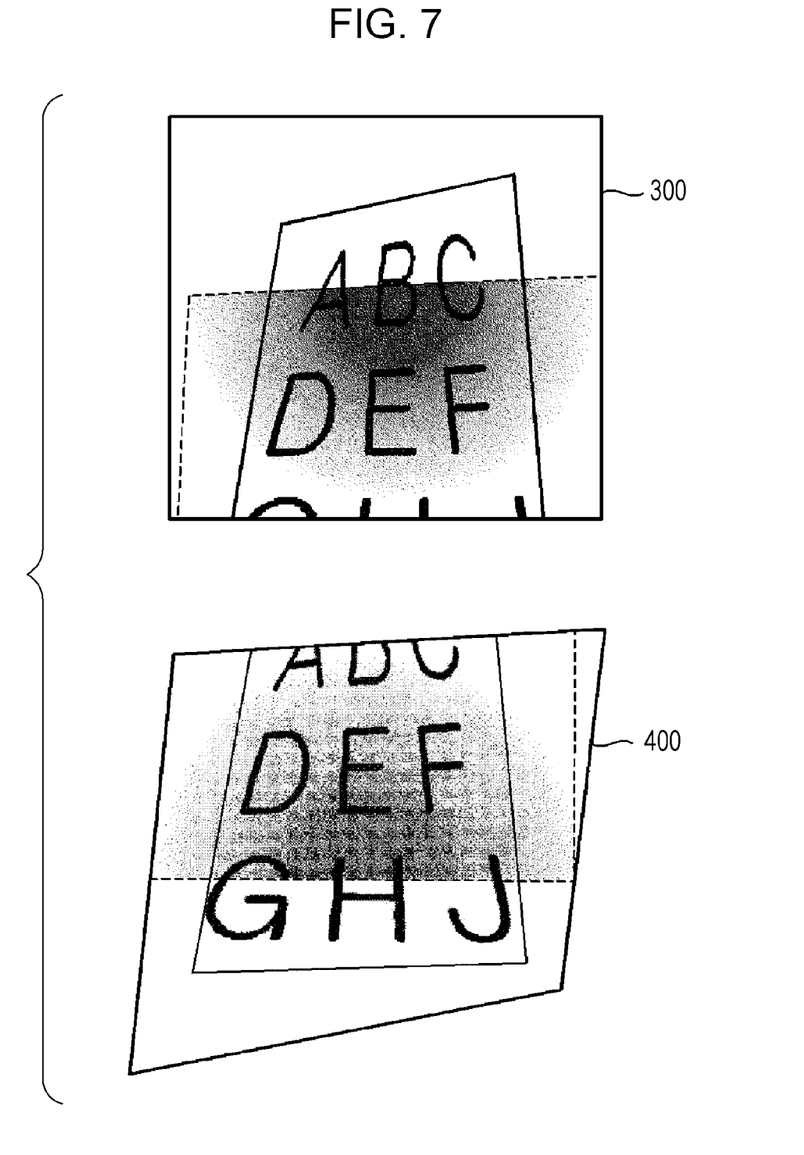
FIG. 7 illustrates the magnitude of a blending ratio in the data processing to produce the combined image data through use of shading.

The combined image data producing section 220 combines image data items (the post-correction image data items for image data items that have been corrected by the correction processing performed by the correction target area correction section 210) and produces combined image data. In the overlapping area in the image data items, the combined image data producing section 220 gives each pixel value of the overlapping image data items a weighting according to a predefined reflection ratio (blending ratio) and then carries out addition so as to obtain a pixel value. The blending ratio mentioned here is set to zero at an end portion of the image data item, and is given a larger value at a portion farther from the end portion. FIG. 7 illustrates the magnitude of the blending ratio in the data processing to produce the combined image data through use of shading. FIG. 7 indicates a higher blending ratio with deeper shading. Such a weighting process suppresses a steep change in color at a position in the combined image data corresponding to the end portion of a certain image data item.

Figure 8:
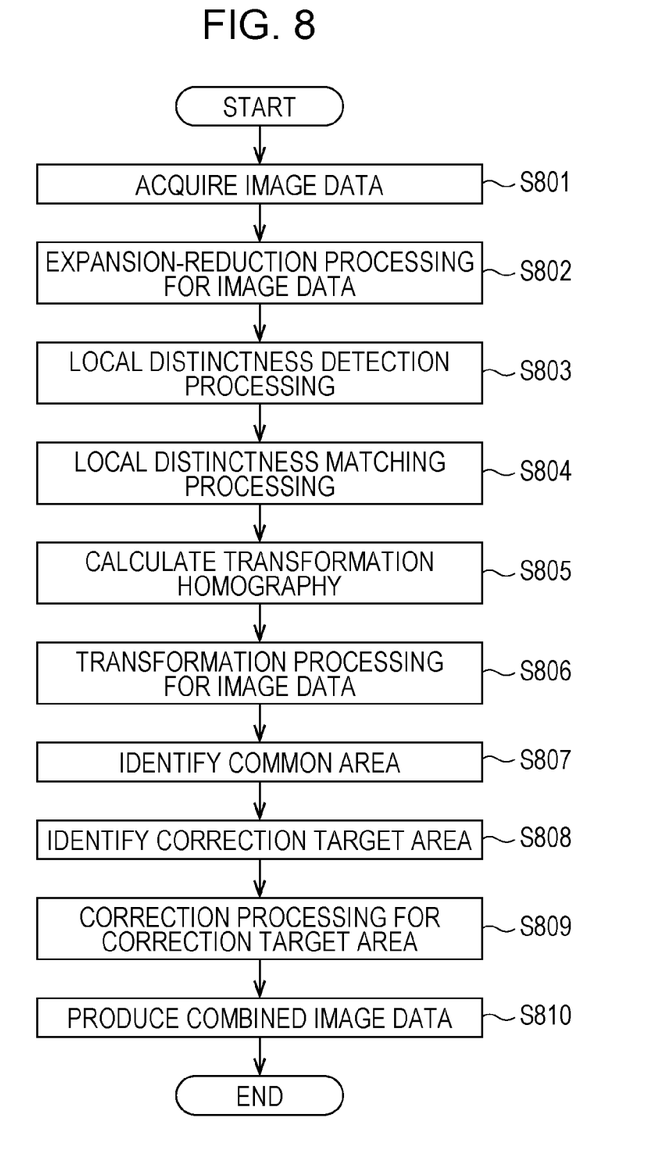
FIG. 8 is a flowchart illustrating an operation of the information processing apparatus according to the first exemplary embodiment of the invention.

Then, an operation of the information processing apparatus 100 of the embodiment will be described by the use of a flowchart. FIG. 8 is a flowchart which illustrates an operation of the information processing apparatus 100 of the first exemplary embodiment of the invention.

To begin with, the image data acquiring section 130 of the information processing apparatus 100 acquires plural image data items sent from the information processing apparatus 600 (S801). Then, the image data expansion-reduction section 140 of the information processing apparatus 100 carries out expansion-reduction processing on the image data items acquired at S801 (S802).

The local distinctness detection section 150 of the information processing apparatus 100 carries out local distinctness detection processing on each of the plural image data items that the expansion-reduction processing is carried out for at S802 (S803). Then, the local distinctness matching section 160 carries out local distinctness matching processing among the plural image data items that the local distinctness detection processing is carried out for at S803 (S804).

The transformation homography calculation section 170 of the information processing apparatus 100 calculates transformation homography for at least a portion of the plural image data items that the local distinctness matching processing is carried out for at S804 (S805). Then, the image data transformation section 180 of the information processing apparatus 100 carries out transformation processing on the image data items that the transformation homography is calculated for at S805 by using the calculated transformation homography (S806).

The common area identifying section 190 of the information processing apparatus 100 identifies a common area for plural image data items including the image data items transformed at S806 (S807). Then, the correction target area identifying section 200 of the information processing apparatus 100 identifies a correction target area in the common area identified at S807 (S808).

The correction target area correction section 210 of the information processing apparatus 100 carries out correction processing on a correction area detected at S808 (S809). Then, the combined image data producing section 220 of the information processing apparatus 100 combines the plural image data items transformed at S806 (the post-correction image data items for image data items that have been corrected at S809) so as to produce combined image data (S810). Then, the information processing apparatus 100 ends the data processing described above.

According to the above configuration, the information processing apparatus 100 which produces one combined image data item from two image data items having an area overlapping in each of the two image data items produces combined image data on the basis of the correction target area information produced on the basis of a result of comparing the two image data items.

Then, if a shadow appears in the image data item, for example, the correction processing is carried out on the basis of the other image data item and then the respective image data items are combined, so that combined image data having a less influential shadow is produced.

Second Embodiment

Figure 9:
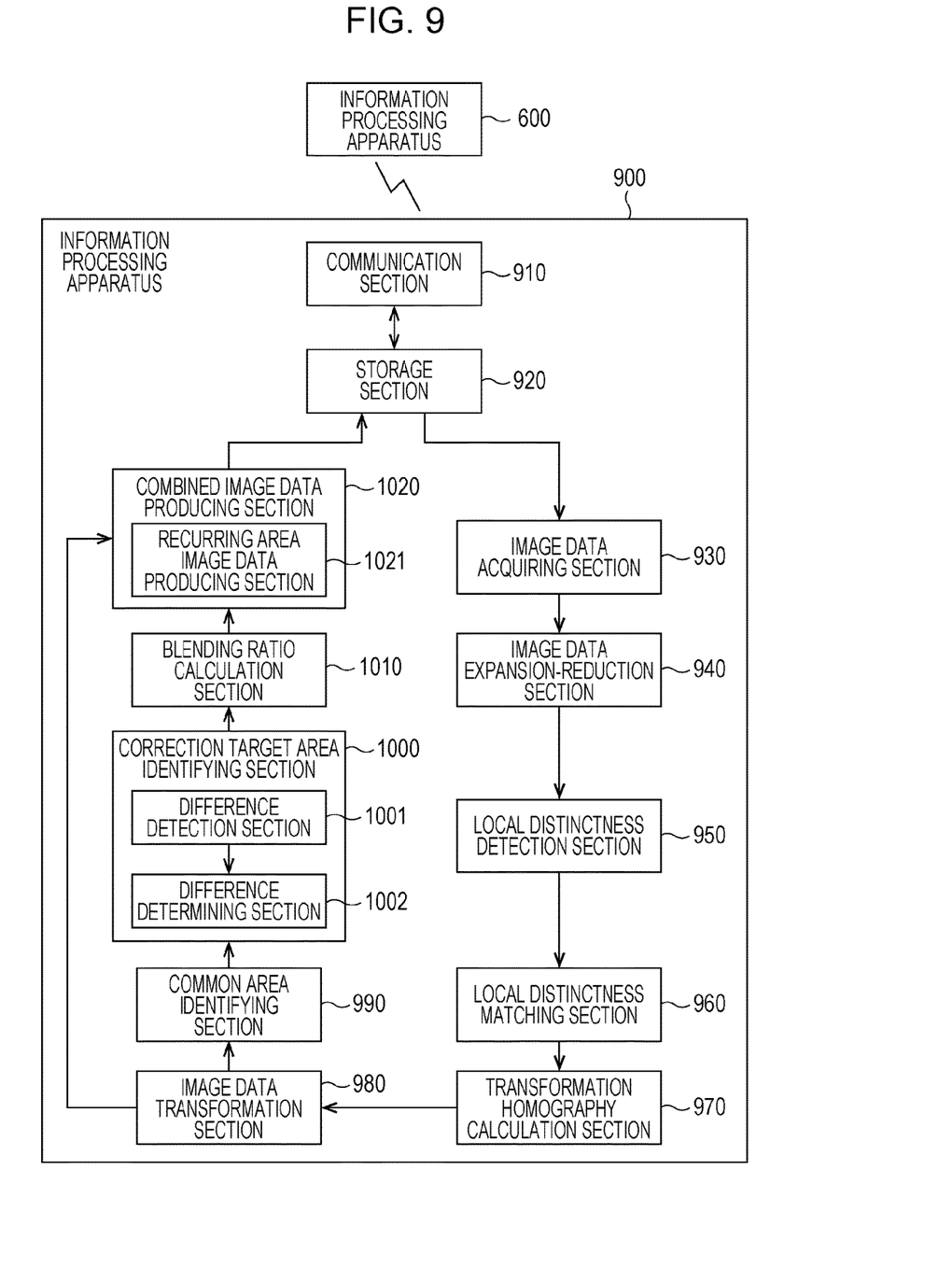
FIG. 9 illustrates a configuration of an information processing apparatus according to a second embodiment of the invention.

FIG. 9 illustrates a configuration of an information processing apparatus 900 of a second embodiment of the invention. The information processing apparatus 900 communicates with an information processing apparatus 600, for example a mobile phone, having a photographing function similar to the information processing apparatus 100 of the first exemplary embodiment, and combines plural image data items sent from the information processing apparatus 600 so as to produce combined image data.

The information processing apparatus 900 has a communication section 910, a storage section 920, an image data acquiring section 930, an image data expansion-reduction section 940, a local distinctness detection section 950, a local distinctness matching section 960, a transformation homography calculation section 970, an image data transformation section 980, a common area identifying section 990, a correction target area identifying section 1000, a blending ratio calculation section 1010 and a combined image data producing section 1020. The correction target area identifying section 1000 further has a difference detection section 1001 and a difference determining section 1002, and the combined image data producing section 1020 further has an overlapping area image data producing section 1021.

The communication section 910, the image data acquiring section 930, the image data expansion-reduction section 940, the local distinctness detection section 950, the local distinctness matching section 960, the transformation homography calculation section 970, the image data transformation section 980, the common area identifying section 990, the correction target area identifying section 1000, the blending ratio calculation section 1010 and the combined image data producing section 1020 are implemented as a function of a CPU for example. The storage section 920 is formed of a storage element such as a memory.

Because the communication section 910, the storage section 920, the image data acquiring section 930, the image data expansion-reduction section 940, the local distinctness detection section 950, the local distinctness matching section 960, the transformation homography calculation section 970, the image data transformation section 980, the common area identifying section 990 and the correction target area identifying section 1000 in the information processing apparatus 900 have the same configuration and carry out the same data processing as the information processing apparatus 100, their explanations are omitted.

The blending ratio calculation section 1010 calculates the blending ratio to be used in image data combining processing by the combined image data producing section 1020 described later. The blending ratio mentioned here is decreased (e.g., fixed to zero) for an area identified as a correction target area by the correction target area identifying section 1000, and the blending ratio is increased (e.g., to a maximum) in an area corresponding to the correction target area for an image data item that no correction target area is identified for.

Figure 10:
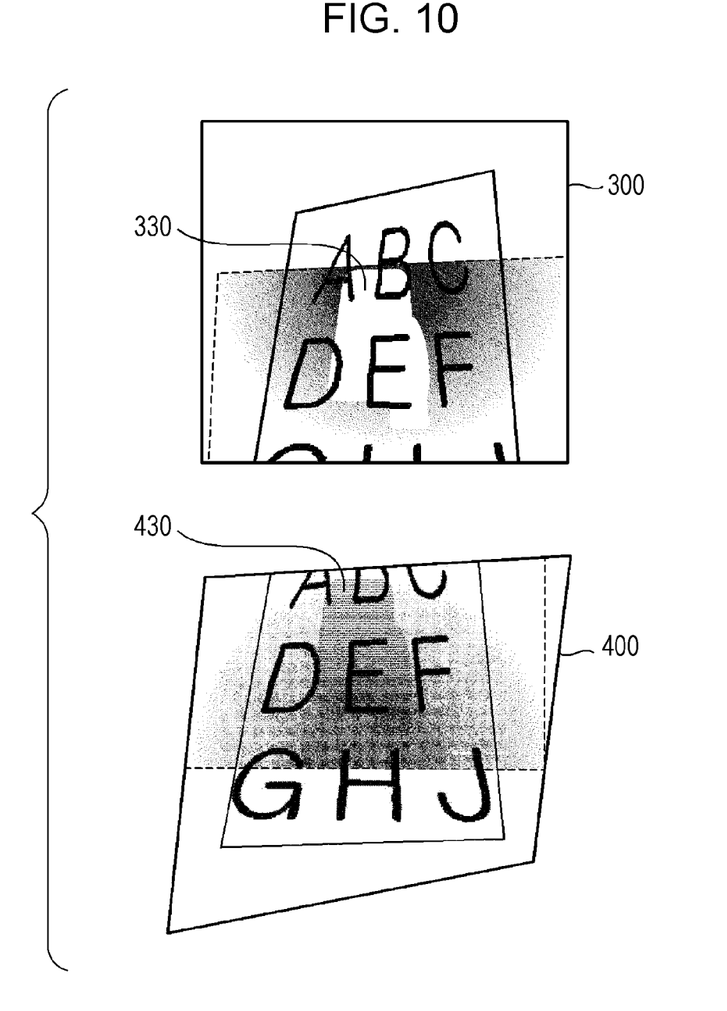
FIG. 10 illustrates a blending ratio calculated by a blending ratio calculation section.

FIG. 10 illustrates a blending ratio calculated by the blending ratio calculation section 1010. FIG. 10 illustrates the magnitude of the blending ratio through use of shading similarly as FIG. 7. Here are depicted results of calculation for the image data items 300 and 400 illustrated in FIG. 2. The blending ratio is set to zero for an area 330 in the image data item 300 identified as a correction target area because of a shadow photographed therein, and is alternatively set to a high value (maximum) for a corresponding area 430 in the image data item 400.

The overlapping area image data producing section 1021 of the combined image data producing section 1020 combines image data items by using the blending ratio calculated by the blending ratio calculation section 1010, so as to produce combined image data.

Figure 11:
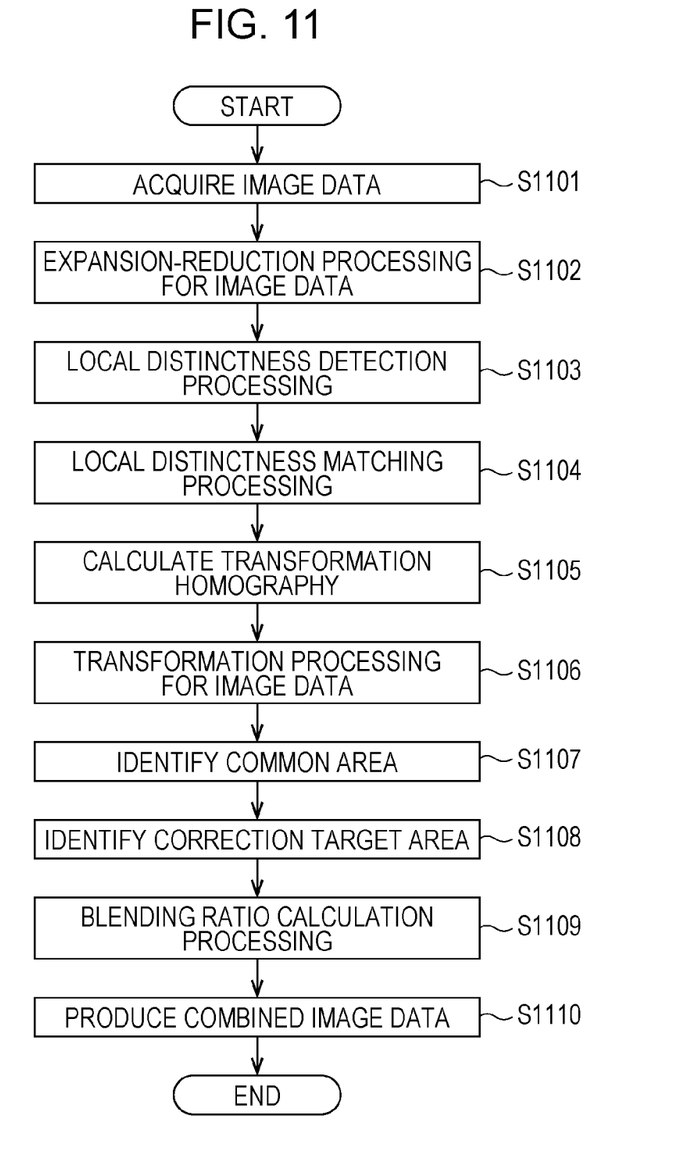
FIG. 11 is a flowchart illustrating an operation of the information processing apparatus according to the second embodiment of the invention.

Then, an operation of the information processing apparatus 900 of the embodiment will be described by the use of a flowchart. FIG. 11 is a flowchart which illustrates an operation of the information processing apparatus 900 of the first exemplary embodiment of the invention.

To begin with, the image data acquiring section 930 of the information processing apparatus 900 acquires plural image data items sent from the information processing apparatus 600 (S1101). Then, the image data expansion-reduction section 940 of the information processing apparatus 900 carries out expansion-reduction processing on the image data items acquired at S1101 (S1102).

The local distinctness detection section 950 of the information processing apparatus 900 carries out local distinctness detection processing on each of the plural image data items that the expansion-reduction processing is carried out for at S1102 (S1103). Then, the local distinctness matching section 960 carries out local distinctness matching processing among the plural image data items that the local distinctness detection processing is carried out for at S1103 (S1104).

The transformation homography calculation section 970 of the information processing apparatus 900 calculates transformation homography for at least a portion of the plural image data items that the local distinctness matching processing is carried out for at S1104 (S1105). Then, the image data transformation section 980 of the information processing apparatus 900 carries out transformation processing on the image data items that the transformation homography is calculated for at S1105 by using the calculated transformation homography (S1106).

The common area identifying section 990 of the information processing apparatus 900 identifies a common area for plural image data items including the image data items transformed at S1106 (S1107). Then, the correction target area identifying section 1000 of the information processing apparatus 900 identifies a correction target area in the common area identified at S1107 (S1008).

The blending ratio calculation section 1010 of the information processing apparatus 900 calculates a blending ratio having a suppressed value for the correction area detected at S1008 (S1109). Then, the combined image data producing section 1020 of the information processing apparatus 900 combines the plural image data items transformed at S1106 by using the blending ratio calculated at S1109 so as to produce combined image data (S1110). Then, the information processing apparatus 900 ends the data processing described above.

According to the above configurations, the information processing apparatuses 100 and 900 which each produce one combined image data item from two image data items having an area overlapping in each of the two image data items each produce combined image data on the basis of the correction target area information produced on the basis of a result of comparing the two image data items.

Then, for example, if a shadow appears in the image data item, the other data item is more strongly reflected and combined, so that combined image data having a less influential shadow is produced.

Incidentally, although the first exemplary embodiment described above presents a configuration that gives each of a pixel value in the area and a pixel value in the other image item a predefined weighting and then to carry out an addition for correcting the correction target area, the invention is not limited to that and, for example, configurations that change the weighting in accordance with the magnitude of the difference, or to replace the pixel value with the other one upon the difference being larger than a predefined value, etc., will do as well.

Further, if a shadow to be corrected extends outside the overlapping area, a configuration that corrects an extending portion of the shadow on the basis of the correction substance in the overlapping area will do as well.

Further, although the second embodiment described above discloses a configuration that sets the blending ratio to a predefined low value in the area corresponding to the correction target area, the invention is not limited to that and, for example, a configuration that changes the weighting in accordance with the magnitude of the difference will do as well.

Further, although the first and second embodiments described above disclose configurations that carry out processing for combining received image data items, each configuration may be mounted on a device having a photographing function (forming a single apparatus that carries out operations ranging from photographing to combining).

Incidentally, the operations of the information processing apparatuses 100 and 900 described here are implemented by execution of a program stored in the storage section that each of them is provided with. The program may be provided through communication, or may be provided while being housed in a computer-readable recording medium such as a compact disk read-only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus for producing combined image data by combining two image data items having an area overlapping in each of the two image data items, the information processing apparatus comprising:
   at least one processor configured to implement:
      an image data acquiring unit that acquires the two image data items;
      a difference obtaining unit that obtains a difference in brightness between the two image data items in the area in which the two image data items overlap on a basis of a result of comparison between the two image data items;
      a difference area identifying unit that identifies a difference area in which the difference obtained by the difference obtaining unit is greater than a predetermined value;
      a surrounding brightness difference obtaining unit that, in units of the two image data items, obtains a difference between a brightness of the difference area, which is acquired by the difference area identifying unit, and a brightness of an area located around the difference area;
      a correction target area information producing unit that produces correction target area information which indicates a correction target area, in which one of the two image data items, having a greater difference obtained by the surrounding brightness difference obtaining unit, is used as the correction target area;
      an image data correction unit that assigns each of the correction target area and a common area unidentified as the correction target area a predefined blending ratio, and carries out addition based on the assigned predefined blending ratios; and
      a combined image data producing unit that produces the combined image data on a basis of the two image data items and the correction target area information,
   wherein each of the two image data items is a separately captured image, and
   wherein the common area unidentified as the correction target area is assigned a heavier blending ratio than the correction target area.

2. The information processing apparatus according to claim 1, wherein the image data correction unit carries out correction processing on one of the two image data items having the correction target area on a basis of the other one of the image data items,
   wherein the combined image data producing unit produces the combined image data on a basis of the image data item for which the correction processing is carried out.

3. The information processing apparatus according to claim 2, wherein the image data correction unit carries out data processing that causes a pixel value of a pixel included in the correction target area in one of the two image data items having the correction target area to be close to a pixel value of a pixel included in an area corresponding to the correction target area in the other one of the image data items.

4. The information processing apparatus according to claim 1, wherein:
   the combined image data producing unit includes an overlapping area image data producing unit that reflects the two image data items in accordance with predefined reflection ratios so as to produce data of an area in the combined image data corresponding to the area in which the two image data items overlap; and
   the overlapping area image data producing unit decreases a reflection ratio of an image data item having the correction target area in producing data of the area in the combined image data corresponding to the correction target area.

5. The information processing apparatus according to claim 2, wherein:
   the combined image data producing unit includes an overlapping area image data producing unit that reflects the two image data items in accordance with predefined reflection ratios so as to produce data of an area in the combined image data corresponding to the area in which the two image data items overlap; and
   the overlapping area image data producing unit decreases a reflection ratio of an image data item having the correction target area in producing data of the area in the combined image data corresponding to the correction target area.

6. The information processing apparatus according to claim 3, wherein:
   the combined image data producing unit includes an overlapping area image data producing unit that reflects the two image data items in accordance with predefined reflection ratios so as to produce data of an area in the combined image data corresponding to the area in which the two image data items overlap; and
   the overlapping area image data producing unit decreases a reflection ratio of an image data item having the correction target area in producing data of the area in the combined image data corresponding to the correction target area.

7. An information processing system for producing combined image data by combining two image data items having an area overlapping in each of the two image data items, the information processing system comprising:
   an acquiring unit that acquires the two image data items;
   a difference obtaining unit that obtains a difference in brightness between the two image data items in the area in which the two image data items overlap on a basis of a result of comparison between the two image data items;
   a difference area identifying unit that identifies a difference area in which the difference obtained by the difference obtaining unit is greater than a predetermined value;
   a surrounding brightness difference obtaining unit that, in units of the two image data items, obtains a difference between a brightness of the difference area, acquired by the difference area identifying unit, and a brightness of an area located around the difference area;
   a correction target area information producing unit that produces correction target area information which indicates a correction target area, in which one of the two image data items, having a greater difference obtained by the surrounding brightness difference obtaining unit, is used as the correction target area;
   an image data correction unit that assigns each of the correction target area and a common area unidentified as the correction target area a predefined blending ratio, and carries out addition based on the assigned predefined blending ratios; and
   a combined image data producing unit that produces the combined image data on a basis of the two image data items and the correction target area information, wherein each of the two image data items is a separately captured image, and wherein the common area unidentified as the correction target area is assigned a heavier blending ratio than the correction target area.

8. A non-transitory computer readable program storing a program causing a computer to execute a process, the process comprising:

acquiring the two image data items;

obtaining a difference in brightness between the two image data items in the area in which the two image data items overlap on a basis of a result of comparison between the two image data items;

identifying a difference area in which the difference obtained by the difference obtaining unit is greater than a predetermined value;

obtaining, in units of the two image data items, a difference between a brightness of the difference area, acquired by the difference area identifying unit, and a brightness of an area located around the difference area;

producing correction target area information which indicates a correction target area, in which one of the two image data items, having a greater difference obtained, is used as the correction target area;

assigning each of the correction target area and a common area unidentified as the correction target area a predefined blending ratio, and carrying out addition based on the assigned predefined blending ratios; and producing the combined image data on a basis of the two image data items and the correction target area information, wherein each of the two image data items is a separately captured image, and wherein the common area unidentified as the correction target area is assigned a heavier blending ratio than the correction target area.

9. An information processing method comprising:

acquiring the two image data items;

obtaining a difference in brightness between the two image data items in the area in which the two image data items overlap on a basis of a result of comparison between the two image data items;

identifying a difference area in which the difference obtained by the difference obtaining unit is greater than a predetermined value;

obtaining, in units of the two image data items, a difference between a brightness of the difference area, acquired by the difference area identifying unit, and a brightness of an area located around the difference area;

producing correction target area information which indicates a correction target area, in which one of the two image data items, having a greater difference obtained, is used as the correction target area;

assigning each of the correction target area and a common area unidentified as the correction target area a predefined blending ratio, and carrying out addition based on the assigned predefined blending ratios; and producing the combined image data on a basis of the two image data items and the correction target area information, wherein each of the two image data items is a separately captured image, and wherein the common area unidentified as the correction target area is assigned a heavier blending ratio than the correction target area.

10. The information processing apparatus according to claim 2, wherein if a shadow to be corrected extends outside the area in which the two image data items overlap, the image data correction unit corrects an extending portion of the shadow on the basis the correction processing carried out on the correction target area.

* * * * *